United States Patent [19]
King, Sr.

[11] 3,868,191
[45] Feb. 25, 1975

[54] MULTIPLE PIPE PULLING DEVICE
[76] Inventor: Lloyd H. King, Sr., 311 Blake Rd., Hopkins, Minn. 55343
[22] Filed: Nov. 19, 1973
[21] Appl. No.: 417,061

[52] U.S. Cl.................. 403/216, 403/275, 403/374, 24/122.6
[51] Int. Cl.......................................... F16g 11/04
[58] Field of Search .......... 403/275, 374, 211, 409, 403/215, 216, 185, 218; 52/223 L, 230; 24/136 B, 136 L, 122.6; 254/29 A; 174/79; 339/273 R, 273 G, 273 F, 270 R

[56] References Cited
UNITED STATES PATENTS
| | | | |
|---|---|---|---|
| 2,443,335 | 6/1948 | Vogel................................. | 24/136 L |
| 2,838,819 | 6/1958 | Falkenstein......................... | 403/211 |
| 3,048,908 | 8/1962 | Bryan................................ | 24/136 L |

Primary Examiner—Andrew V. Kundrat
Attorney, Agent, or Firm—Leo Gregory

[57] ABSTRACT

A multiple pipe pulling device comprising a cylindrical housing, a plurality of passages disposed through said housing spaced circularly about the axis thereof, said housing having a bore therethrough, said bore being frusto-conical in form, said bore diverging to expose diverging portions of said passages from a point spaced inwardly of one end of said housing adjacent the tapered end of said bore, a plurality of pipes disposed through said passages, a wedge member frusto-conical in form disposed into said bore engaging the portions of said pipes along the exposed portions of said passages to secure the same within said housing and a threaded rod extending outwardly of said housing from the tapered end of said member.

5 Claims, 5 Drawing Figures

3,868,191

MULTIPLE PIPE PULLING DEVICE

BACKGROUND AND SUMMARY OF THE INVENTION

The art is well developed with respect to pipe pulling devices, but to the knowledge of the inventor herein such devices relate to pulling single pipes.

With regard to underground watering systems, it is desirable to have some means to pull at one time a plurality of pipes as through a slit trench in installing a watering system with said plurality of pipes, which are generally of a relatively small diameter, running to a common supply source. Plastic pipes are commonly used for such purpose and care must be exercised in the use of a pipe pulling device in connection with plastic pipes to avoid deforming or rupturing such pipes.

It is an object of this invention, therefore, to provide a device arranged and constructed to pull a plurality of pipes.

It is another object of this invention to provide such a device to pull a plurality of pipes which is so arranged and constructed as not to damage such pipes.

It is another object of this invention to provide a device to pull at one time a plurality of pipes which device is readily engaged with and disengaged from said pipes.

More generally stated, it is an object of this invention to provide a device to pull a plurality of pipes, said device being cylindrical in form and having a plurality of passages extending therethrough disposed circularly about the axis thereof, said device having a bore therethrough, said bore being substantially frusto-conical in form diverging sufficiently from a point inwardly of one end of said bore to expose diverging portions of said passages in the direction of the other end of said bore, a wedge member frusto-conical in form disposed into said bore, said wedge member engaging the portions of said pipes along the exposed portions of said passages to hold the same securely within said housing.

These and other objects and advantages of the invention will be set forth in the following description made in connection with the accompanying drawings in which like reference characters refer to similar parts throughout the several views and in which.

DESCRIPTION OF A PREFERRED EMBODIMENT

Figure 1:
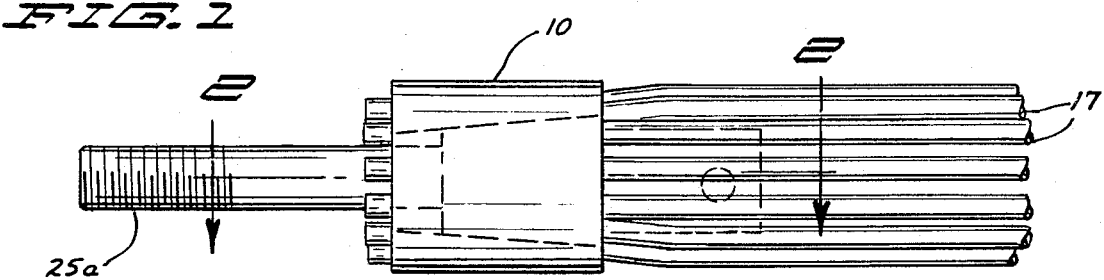
FIG. 1 is a broken view in side elevation.
Figure 2:
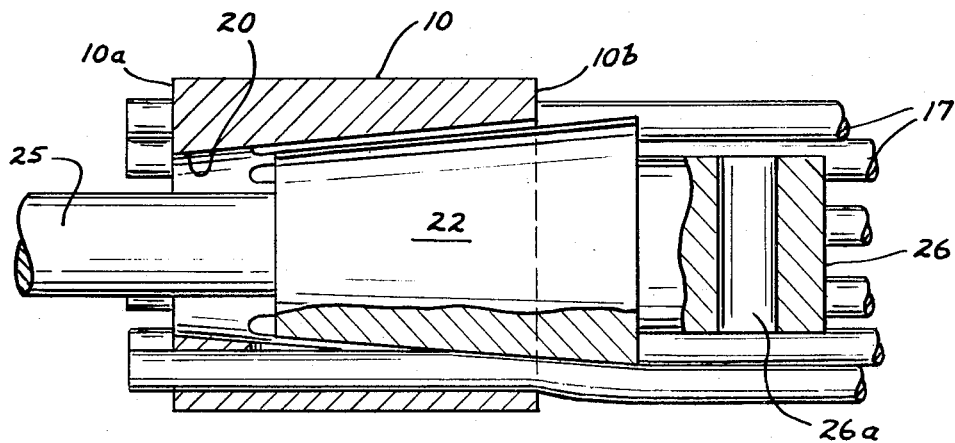
FIG. 2 is a side view in horizontal section on an enlarged scale taken on line 2 of FIG. 1.
Figure 3:
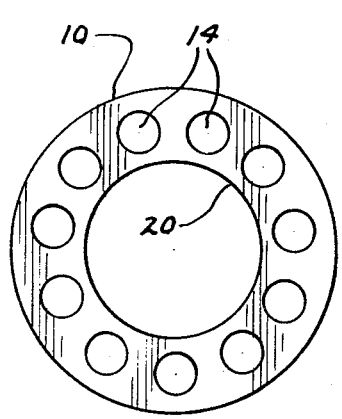
FIG. 3 is a view in end elevation.

Referring to the drawings, a housing or holding member 10 is shown cylindrical in form and preferably formed of a suitable metal material. Extending longitudinally through siad housing spaced circularly about the axis thereof and spaced inwardly of the surface thereof are a plurality of parallel passages 14.

Disposed through said respective passages are a plurality of pipes 17 which may be variously formed and for purpose of use in connection with an underground watering system, said pipes are conveniently formed of a suitable plastic material.

Figure 4:
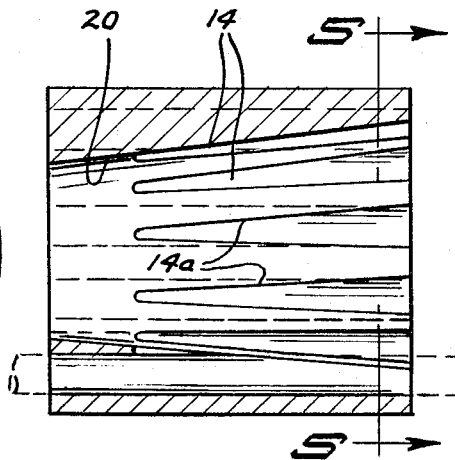
FIG. 4 is a view of a portion of the device herein in vertical longitudinal section.
Figure 5:
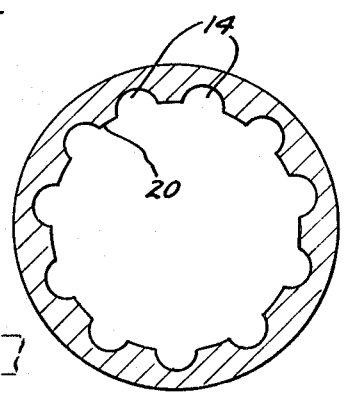
FIG. 5 is a view in vertical cross section taken on line 5—5 of FIG. 4 as indicated.

Extending through said housing 10 is a bore 20 substantially frusto-conical in form diverging from adjacent the forward end 10a of said housing in the direction of the said rearward end 10b of said housing. With reference to FIG. 4, it is seen that as said bore diverges, the passages 14 become exposed and are made to have diverging portions of exposure 14a to the extent as shown of having approximately a diametrical portion of each of said passages exposed at the outer end of said housing.

Disposed into said bore 20 is a gripping or wedge member 22 which is frusto-conical in form corresponding to that of said bore 20. Extending outwardly of the tapered end portion of said member 22 is a stem or rod portion 25 having a threaded free end portion 25a.

Extending forwardly of said wedge member 22 is a stub shaft 26 having a transverse opening 26a therethrough.

OPERATION

The purpose of the device herein is to provide means to pull a plurality of pipes at one time through a slit trench in laying an underground pipeline as for a watering system. In many portions of the system, pipes are laid in parallel until each may branch out to a specific sprinkling head and also said pipes for various lengths thereof are laid in a common trench running to a common control panel and water supply.

The ends of pipe 17 are disposed through the passages 14 of said housing as illustrated and the wedge or gripping member 22 is positioned being disposed into said housing from the rearward end or the enlarged bore end portion thereof. It is seen that as said wedge member 22 is moved into said bore, it engages the portions of said pipe 17 which are exposed through the exposed portions of said passages. Said wedge may be secured to hold said pipes fast by a jerk at the end of the shaft 25 or the end of the shaft 26 may be tapped. There is just sufficient exposure of the pipes through the passages 14 for good gripping engagement by said wedge member and not so much of the pipe is exposed as might result in damage to said pipes by the gripping action.

To release said wedge member 22, a rod may be disposed through said transverse opening 26a and be tapped as with a hammer to free such wedge or the free end of the rod 25 may be tapped for the same purpose.

The device herein results in considerable labor saving effort and contributes substantially to the efficiency of installing an underground system of piping as herein indicated.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A multiple pipe pulling device having in combination
    a cylindrical housing,
    a plurality of bores extending axially through said housing spaced circularly about the axis thereof,
    a through bore extending through said housing, said bore being frusto-conical in form and intersecting said bores to gradually expose increasing portions of each of said bores from a point spaced inwardly of one end of said housing, a wedge member disposed in said through bore,
a plurality of pipes respectively disposed through said bores, and
said wedge member engaging said pipes at the exposed portions of said bores.
2. The structure set forth in claim 1, wherein said wedge member has a stem portion extending outwardly of said housing through the small tapered end of said through bore and having a threaded free end portion.
3. The structure set forth in claim 1, wherein said wedge member has a shaft portion at one end having a transverse opening therethrough.
4. The structure set forth in claim 1, wherein said wedge member is frusto-conical in form.
5. The structure set forth in claim 1, wherein said parallel bores are disposed to be parallel to one another.

* * * * *